Dec. 23, 1969  B. B. REILLY  3,485,749
SEWAGE TREATMENT PROCESS AND APPARATUS
Filed Aug. 30, 1965  2 Sheets—Sheet 1
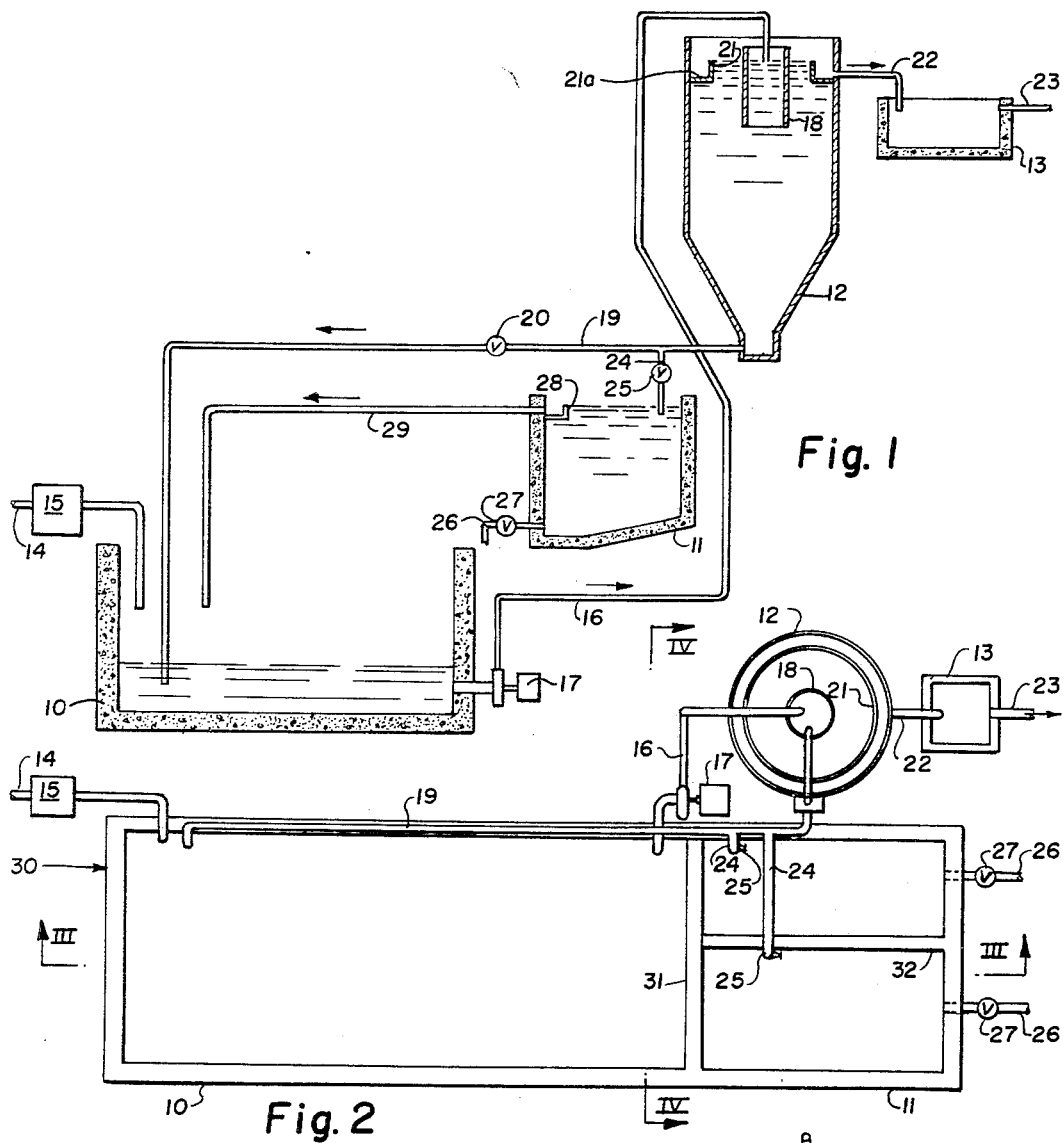
Fig. 1
Fig. 2
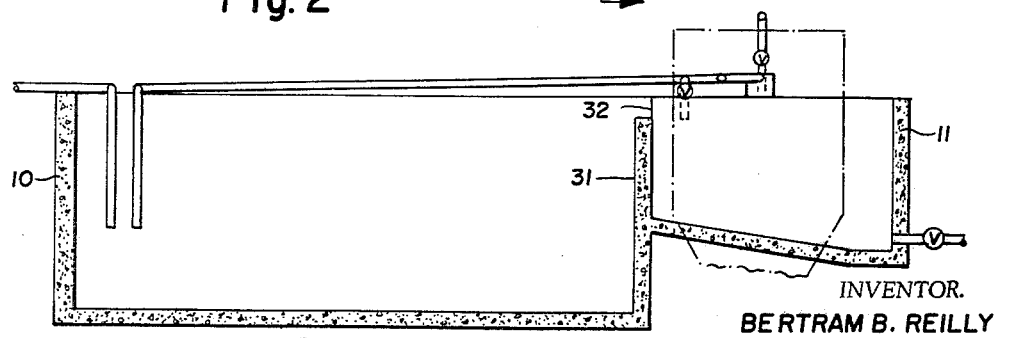
Fig. 3
INVENTOR.
BERTRAM B. REILLY
BY
*Christy, Parmelee & Strickland*
ATTORNEY Dec. 23, 1969  B. B. REILLY  3,485,749
SEWAGE TREATMENT PROCESS AND APPARATUS
Filed Aug. 30, 1965  2 Sheets-Sheet 2

INVENTOR.
BERTRAM B. REILLY
BY
*Christy, Parmelee & Strickland*

ATTORNEY

United States Patent Office 3,485,749
Patented Dec. 23, 1969

3,485,749
SEWAGE TREATMENT PROCESS AND APPARATUS
Bertram B. Reilly, Ben Avon Heights, Pa.
(17 Briar Cliff Road, Pittsburgh, Pa. 15202)
Filed Aug. 30, 1965, Ser. No. 483,593
Int. Cl. C02c 1/10, 1/06
U.S. Cl. 210—7                    22 Claims

ABSTRACT OF THE DISCLOSURE

This invention relates to the treatment of sewage, and particularly to a process and apparatus for the oxidation treatment of sewage wherein raw sewage is introduced to an aeration tank and pumped to a settling tank at a substantially constant rate. Settled sludge is recirculated back to the aeration tank by gravity flow and clarified sewage liquor flows by gravity from the settling tank to a chemical treatment tank, the arrangement being such that flows to and from the settling tank are maintained at a substantially constant rate.

---

In a common type of modern sewage treating plants and particularly those designed for smaller municipalities, raw sewage is discharged, after screening, into a large aerating tank where the sewage is subjected to aerobic digestion. At a predetermined level above the bottom of this tank and below the top there is a discharge pipe through which there is gravity flow from the receiving tank to a settling tank, which is turn has an overflow to a chlorinating tank, where the more or less clear effluent water from the settling tank is chlorinated and discharged. This system is satisfactory where the rate of inflow and the rate of discharge is relatively constant. In most cases, however, the rate of flow into the receiving tank is much greater at certain hours than at others. As a result there is a wide discrepancy in the rates at which the sewage is treated and the retention time in the system, with a resulting inadequate treatment of the sewage at certain periods.

According to the present invention there is provided a sewage treatment plant and process wherein the plant is designed to accommodate surges or fluctuations of the influent sewage while maintaining a fairly constant effluent rate and uniform treatment of all sewage passing through the system. Influent raw sewage is first introduced to an aeration tank with sufficient freeboard to accept surges in the influent rate without overflowing. From this tank the sewage is pumped to a settling tank at a level above the areation tank at a rate twice the average influent rate of raw sewage to the plant. Sludge from the settling tank is recirculated back to the areation tank by siphon or gravity flow at a flow rate regulated to approximately the average plant influent rate. The plant is calibrated for a predetermined influent rate averaged over a prolonged period of time, preferably a day. Overflow from the settling tank, which is approximately equal to the average influent rate, is passed to the usual chlorinating tank, thence discharged into a disposal area such as receiving streams. Periodically a part of the sludge withdrawn from the settling tank is passed to one or more aerobic digester tanks where the concentrated sludge which has accumulated in the system can be substantially completely oxidized over a relatively long period of time. The aerobic digester tank is elevated with respect to the aeration tank and its overflow of relatively clear liquor flows back into the aerator tank, while digested sludge is drawn off from the bottom of the digester tank and disposed of in a drying bed or other disposal area. The arrangement described permits the averaging of the throughput of the plant whereby the sewage can be uniformly and thoroughly treated despite fluctuations in the influent rate. The digester and areation tanks can be combined into a single partitioned tank for more efficient use of space and materials. Other novel features include an improved settling tank and apparatus for the siphon removal of sludge from the settling tank for recirculation to the aeration and digester tanks.

An object of the invention is to provide a new and useful process for the treating of sewage and apparatus therefor.

Another object is to provide an improved sewage treatment plant capable of thoroughly treating the sewage despite fluctuations in the influent rate of raw sewage to the plant.

These and other objects will be apparent to those skilled in the art and more fully understood by reference to the following description wherein:

FIG. 1 is a diagrammatic illustration of a sewage treatment plant for carrying out the process according to the invention;

FIG. 2 is a plan view showing one arrangement of apparatus for carrying out the process;

FIG. 3 is a side elevation of the apparatus of FIG. 2 taken along the line III—III of FIG. 2;

Figure 5:
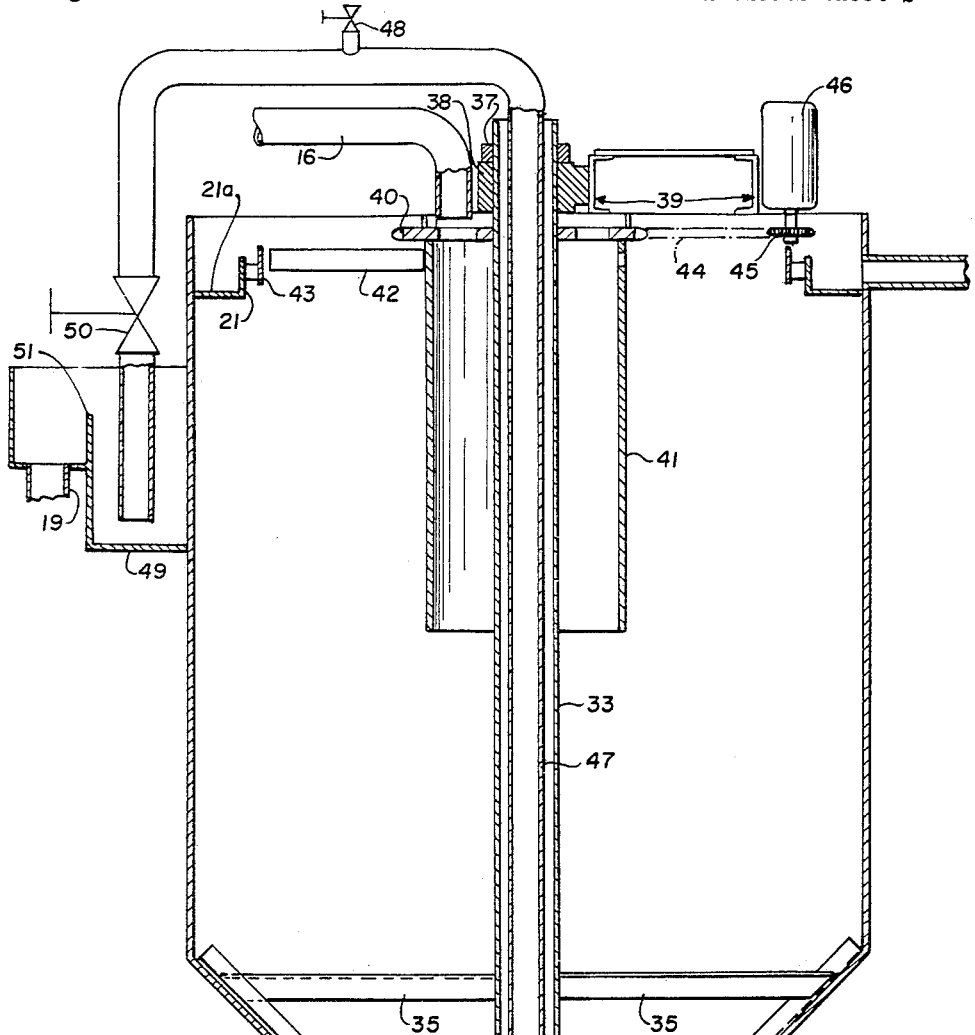
FIG. 5 is a sectional side elevation of an improved settling tank with siphon sludge removal means.
Figure 4:
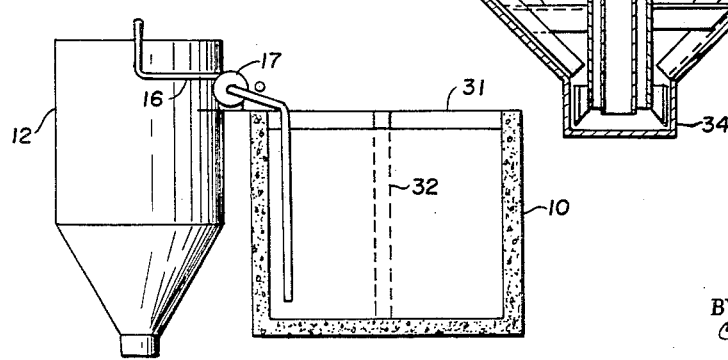
FIG. 4 is an end elevation taken along the line IV—IV of FIG. 2.

Referring to the drawings, and first to FIG. 1, there is shown a novel sewage treatment plant for carrying out the process of the invention. The plant basically comprises four tanks, an aeration and surge tank 10 for receiving the raw sewage, an aerobic digester tank 11 for the final removal of solid residue from the system and a settling tank 12 wherein concentration of solids and removal of liquid takes place, which three tanks are at successively higher elevations, and a chlorinating tank 13 at a level lower than the settling tank 12. It will be understood that the elevational differences are greatly exaggerated in FIG. 1 for purposes of illustration, whereas in reality only a slight difference is required for proper functioning of the system. The elevational differences referred to herein are hydraulic elevations indicating fluid levels in the tanks and are not necessarily physical tank elevations.

Raw solid-containing sewage flows through the inlet pipe 14 to a comminutor and screen indicated as 15, where solid waste materials are particulated and unparticulatable materials can be screened and removed, then into the aeration and surge tank 10 which is preferably large enough so that the depth of sewage normally contained therein is relatively shallow and high enough to provide sufficient capacity to handle surges in the influent sewage without overflowing. Preferably the tank 10 is designed with sufficient freeboard above the normal liquid level therein to be capable of impounding at least 25% of the rated daily flow. The shallow design exposes a large surface area to direct surface aeration and, where submerged air-diffuser type of mechanical aeration is employed in the tank, lower air pressure and less power is required because of the lower hydraulic head against which the compressors must operate. Mechanical agitators or other suitable devices may be used to accomplish aeration as will be understood by those skilled in the art. Since the agitators of whatever type are known and are not germane to this invention, no agitator has been shown in the drawings. Pipe 16 conducts solid-containing sewage from near the bottom of tank 10 to the settling tank 12 with the aid of the constant volume metering pump 17 located in the pipe line 16. The pump is sized to deliver sewage to the settling tank 12 at approximately twice the average inflow rate of raw sewage to the plant.

The settling tank 12 is shown as round, relatively tall tank with sloping side walls near the bottom portion thereof, but may be of a suitable design having characteristics favorable for the separation, gravity concentration and collection of solid particles near the bottom. Sewage containing solid particles is discharged from pipe 16 into a centrally disposed influent well 18 mounted in the settling tank 12. The well 18 is an open ended member extending above the liquid level in the tank to a depth substantially below the liquid level whereby the influent solid containing sewage is kept out of contact with the relatively clarified sewage liquor in the upper portions of the tank. Sludge settles to the bottom of the tank 12 from whence it flows as a watery concentrate by gravity through pipe 19 back to the aeration tank 10. Control valve 20 in pipe 19 regulates the flow or recycle from tank 12 to tank 10 to a rate approximately equal to one-half the flow from tank 10 to tank 12. Since the settling tank 12 receives about twice the amount of sewage being drawn off and recirculated to the aeration tank 10, the balance overflows the weir 21 around the upper wall of tank 12 and flows by gravity, as clarified aerated sewage liquor, to the chlorine contact tank 13 through pipe 22. As indicated in the drawing the tank 12 has an inner radial flange therearound and a vertical flange or weir 21 around the inner edge of the radial flange so that the two flanges and tank sidewalls form a circumferential trough 21a which opens into pipe 22 discharging into the chemical treatment tank 13. From tank 13 the treated liquor passes through pipe 23 to a discharge stream or other disposal area. The weir is concentric with but spaced from the open ended well 18.

Because of the recirculation of solids between settling tank 12 and aerator tank 10, solids will tend to accumulate in the system so that it is necessary to periodically remove the accumulation from circulation. To accomplish this, an aerobic digester tank 11 is provided. Sludge from the bottom of settling tank 12 enters the digester tank 11 through branch pipe 24 coming off line 19. Control valve 25 in line 24 controls the flow of sewage into the dligester tank. Valve 25 is normally closed and is opened preferably during periods of low inflow to the plant. Tank 11 is also provided with suitable mechanical agitation or air diffuser aeration apparatus similar to that of the aeration tank 10. The solids thus deposited in tank 11 can remain for extended periods sufficient to substantially completely oxidize them to a non-oderous ash or residue. The collected inert residue may from time-to-time be drawn off through pipe 26 and valve 27 and deposited in drying beds or other disposal area. Clarified sewage liquor accumulating in digester tank 11 is permitted to overflow weir 28 and return to the aeration tank by gravity flow through pipe 29. It is preferable to interrupt mechanical aeration in the digester tank when valve 25 is opened in order to promote settling so that substantially clear liquor is returned to the aeration tank from the digester tank. If desired, two digester tanks in parallel can be provided permitting longer undisturbed periods without the addition of raw sludge prior to the drawing off of digested solids through pipe 26.

Referring to FIGS. 2 to 5 there is shown the preferred apparatus for carrying out the process of the invention. The apparatus is functionally the same as in FIG. 1 and is physically substantially the same except for the settling tank and the unitary construction of the aeration and digester tanks. The tanks 10 and 11 are comprised of a single, generally rectangular, box-like vessel or tank enclosure 30 having a transverse partition 31 extending below the enclosure side walls to serve as one end wall of tank 10, as one end wall of the two digester tanks 11 and also as a weir controlling the flow of liquor from the tanks 11 to the tank 10, thereby eliminating the need for piping between the tanks 10 and 11. A second partitition member 32 extending above the wall 31 forms a common wall dividing the digester space into two separate digester tanks 11 in parallel. Each tank 11 is provided with its own branch pipe 24, control valve 25 and digested sludge ash removal line 26 and valve 27 as before described.

Referring to FIG. 5 there is shown a sectional side elevation of the preferred form of settling tank 12. The outer shell of the tank is the same as before described and also has an overflow weir 21 and trough 21a circumposed around the inner upper wall portion. In the center of the tank there is a rotatably mounted torque tube 33 extending from above the upper level of the tank side walls down into the sludge hopper 34 at the bottom of the tank. The lower portion of the tube 33 carries a plurality of radially extending arms 35 at the ends of which are mounted a plurality of scraper bars 36 which keep the sloping side walls of the tank cleaned of sludge which then falls down into the hopper 34. The radial arms 35 decrease in length near the bottom of the tank where the sloping side walls converge and the angle of the bars 36 conforms to the angle of slope of the side walls. Circumposed around the upper part of the tube 33 there is a thrust collar 37 and thrust bearing 38 attached to supporting beams 39 mounted on the upper edge of the tank walls. Below the bearing 38 there is an open sprocket wheel 40 circumposed about and attached to the tube 33. Depending from and carried by the sprocket wheel is an influent well 41 which carries radial arms or skimmer bars 42 which extend outwardly to a point adjacent the scum baffle 43 mounted on weir 21. The sprocket wheel 40 is driven by a chain 44 from drive wheel 45 rotated by the slow speed gear motor 46 mounted on the beams 39. Sewage from the aeration tank 10 and line 16 passes between the openings in sprocket wheel 40 and down into the influent well 41. Sludge is carried from the sludge hopper 34 by the siphon pipe 47 disposed within the torque tube 33. At the top of the siphon pipe is a valve 48 for priming or establishing the suction in the siphon pipe by suitable suction means (not shown). The siphon pipe extends downwardly along the side of the tank into a siphon seal box 49 mounted on the outside of the tank. Valve 50 regulates the flow of sludge in the siphon pipe. The seal box 49 has a weir 51 at a level above the terminus or discharge end of the siphon pipe and over which the settling tank sludge flows into pipe 19 to be carried back to the aeration tank.

The system thus described provides a novel sewage plant which adequately treats all the sewage influent thereto and which is so designed that the effluent rate of treated sewage is substantially constant despite fluctuations in the influent rate. As a result, the level of liquid in the settling tank is constant, and the overflow of liquid to the chlorinating tank is constant and the process functions uniformly notwithstanding the rise and fall of the liquid level in the receiving tank. Except for the flow from the aeration tank to the settling tank, all flow in the system is gravity flow. As a further refinement float operation alarms (not shown) or other fluid level indicators and controls may be provided in the various tanks as will be understood by those skilled in the art. The process of the invention can be carried out with novel apparatus which is compact in design and has low power requirements which features make the plant especially attractive to small municipalities, institutions and the like.

It will be apparent to those skilled in the art that other modifications and variations in the invention as described are possible within the scope and spirit of the invention.

I claim:

1. The method of treating sewage in a treating plant having an aeration tank, a settling tank and a chemical treatment tank, comprising, (a) continuously depositing raw, solid-containing sewage in the aeration tank at irregular rates of flow over a prolonged period of time, (b) continuously withdrawing solid-containing sewage from the aeration tank at a substantially constant rate greater than the average rate of flow of raw sewage into the aeration tank, which average is taken over the prolonged period, and passing it to the settling tank, (c) continuously withdrawing sludge from the settling tank and returning it to the aeration tank at a rate less than the rate of withdrawal from the aeration tank, (d) continuously withdrawing clarified liquor from the settling tank and passing it to the chemical treatment tank at a substantially constant rate not greater than the difference between the aeration tank to settling tank flow rate and the settling tank to aeration tank flow rate, and (e) discharging the chemically treated liquor.

2. The method of treating sewage in a treating plant having a plurality of treating tanks including first and second aeration tanks, and a settling tank at successively higher elevations sufficient to enable gravity flow between the tanks in the reverse order named, a chemical treatment tank and means for selectively transferring sewage from one tank to another, comprising, (a) continuously depositing raw, solid-containing sewage in the first aeration tank, (b) continuously withdrawing solid-containing sewage from the first aeration tank and pumping it to the settling tank for separation into a solid-containing sludge portion and a clarified liquor portion, (c) continuously withdrawing sludge from the settling tank and returning it to the first aeration tank by gravity flow, (d) intermittently withdrawing solid-containing sewage from the settling tank and passing it by gravity flow to the second aeration tank for aerobic digestion of the solids and separation of the sewage into solid-containing sludge and clarified liquor, (e) intermittently withdrawing digested solids from the second aeration tank and passing it to a disposal area, (f) intermittently withdrawing clarified liquor from the second aeration tank and passing it by gravity flow to the first aeration tank, (g) continuously withdrawing clarified liquor from the settling tank and passing it to the chemical treatment tank, and (h) continuously withdrawing chemically treated liquor from the chemical treatment tank and discharging it to a disposal area.

3. The method of claim 2 wherein (a) solid-containing sewage is pumped from the first aeration tank to the settling tank at a rate greater than the average rate of deposition of raw sewage into the first aeration tank, and (b) the combined solid-containing sewage flow from the settling tank to the first and second aeration tanks, is at a rate not greater than the difference between the influx rate to the settling tank and the outflow rate to the chemical treatment tank.

4. The method of claim 2 wherein the raw, solid-containing sewage is first comminuted before deposition in the first aeration tank and the chemical treatment tank is a chlorine contact tank.

5. The method of claim 3 wherein the sewage is pumped to the settling tank at a rate approximately equal to twice the average influent rate to the plant, and the rate of flow from the settling tank to the aeration tanks is approximately equal to the average influent rate to the plant.

6. The method of claim 2 wherein the solid-containing sludge passed to the aeration tanks from the settling tank is siphoned from the settling tank.

7. The method of treating solid-containing sewage in a sewage treatment plant having a plurality of treating tanks and means for transferring sewage from one tank to another, comprising, (a) comminuting the solids in the influent raw sewage, (b) depositing the comminuted sewage in an aeration tank, (c) pumping solid-containing sewage at a substantially constant rate greater than the average plant influent rate from the aeration tank to a settling tank for separation of the sewage into solid-containing sludge and clarified liquor, (d) siphoning sludge from the settling tank and selectively delivering it to the aeration tank and to an aerobic digester tank at a combined rate less than the rate of flow from the aeration tank to the settling tank, (e) flowing clarified liquor from the settling tank to a chemical treatment tank at a rate approximately equal to the difference between the influent rate to the settling tank and the effluent rate from the settling tank to the aeration and aerobic digester tanks, (f) periodically discharging digested solids from the aerobic digester tank to a disposal area, and (g) discharging chemically treated clarified liquor sewage from the chemical treatment tank to a disposal area.

8. A sewage treatment plant having means for introducing raw solid-containing sewage thereinto, comprising, (a) an aeration tank for receiving the influent raw sewage and having sufficient capacity to accept surges in the influent rate without overflowing, (b) a settling tank for the separation of solid-containing sewage into solid-containing sludge and clarified sewage liquor, (c) a chemical treatment tank for the treating of clarified sewage liquor, (d) means for transferring solid-containing sewage from the aeration tank to the settling tank at a substantially constant rate greater than the average rate influent to the plant, (e) means for transferring sludge from the settling tank to the aeration tank at a rate less than the rate of transfer to the settling tank, (f) means for transferring clarified sewage liquor from the settling tank to the chemical treatment tank at a rate approximately equal to the difference between the earlier mentioned rates of transfer to and from the settling tank, and (g) means for discharging the chemically treated liquor from the chemical treatment tank.

9. The sewage treatment plant of claim 8 including means for periodically withdrawing solids from the circulation established between the aeration and settling tanks.

10. The sewage treatment plant of claim 9, wherein the means for periodically withdrawing solids comprises, (a) an aerobic digester tank for the digestion of sludge solids deposited therein, (b) means for periodically transferring solid-containing sludge from the settling tank to the digester tank, and (c) means for discharging digested solids from the digester tank to a disposal area.

11. The sewage treatment plant as defined in claim 8, including means for comminuting solids in the raw sewage influent to the plant prior to the deposition thereof into the aeration tank.

12. The sewage treatment plant of claim 8, wherein, (a) the means for transferring sewage from the aeration tank to the settling tank comprises a pipe line connecting the tanks and a pump in the line regulated to deliver the sewage to the settling tank at the stated rate, and (b) the means for transferring sludge from the settling tank to the aeration tank comprises a second pipe line connecting the two tanks and a valve in the second line for regulating the flow therein at the stated rate.

13. The sewage treatment plant of claim 8, wherein means are provided for maintaining the fluid level in the settling tank at a level sufficient to establish gravity flow from the settling tank to the aeration tank.

14. A sewage treatment plant having influent thereto raw, solid-containing sewage, comprising, (a) an aeration tank for receiving the sewage influent to the plant and having sufficient capacity to accept surges in the influent rate without overflowing, (b) a settling tank for receiving solid-containing sewage for separation into solid-containing sludge and clarified sewage liquor, (c) a chemical treatment tank for chemically treating clarified sewage liquor, (d) a first pipe line for conducting solid-containing sewage from the aeration tank to the settling tank, (e) a second pipe line for conducting sludge from the settling tank to the aeration tank, (f) a third pipe line for conducting clarified sewage liquor from the settling tank to the chemical treatment tank, (g) means for maintaining the fluid level in the tanks at a level sufficient to establish gravity flow from the settling tank to the aeration and chemical treatment tanks, including, a constant volume metering pump in the first pipe line, regulated to deliver sewage to the settling tank at a rate approximately equal to twice the average rate influent to the plant, a regulating valve in the second pipe line for regulating the flow therein to a rate approximately equal to the average rate influent to the plant, and an overflow weir in the upper portion of the settling tank over which the clarified liquor flows into the third pipe line.

15. The sewage treatment plant defined in claim 14, including an aerobic digester tank and means for periodically transferring thereto a portion of the sludge flowing from the settling tank to the aeration tank, and means for withdrawing digested sludge solids from the digester tank.

16. The sewage treatment plant of claim 14, wherein the gravity flow of sludge from the settling tank to the aeration tank is by means of a siphon pipe having its intake end extending into the settling tank adjacent the bottom thereof and its other end connected to discharge into the second pipe line, and means for establishing the siphon flow in the siphon pipe.

17. In a sewage treatment plant having influent thereto raw solid-containing sewage, a plurality of tanks for treating the sewage and means for transferring sewage from one tank to another, the combination therewith of a settling tank for receiving solid-containing sewage and separating the sewage into solid-containing sludge and clarified sewage liquor, comprising, (a) a generally cylindrical upper portion forming upper tank side walls, (b) a generally conically shaped lower portion continuous with the upper portion forming inwardly sloping lower tank side walls into which the sludge settles, (c) an overflow weir and trough member around the upper inner wall of the tank for maintaining the liquid level in the tank and transferring clarified sewage liquor to a different tank, (d) a centrally disposed tube rotatably mounted on the tank and extending from above the weir into the sludge containing lower portion of the tank, (e) means for rotating the tube, (f) a scraper carried by the tube and engaging the sloping tank side walls to clean the latter of sludge, (g) a siphon tube disposed within the rotatable tube and extending from above the level of the weir downwardly into the sludge in the lower portion of the tank for withdrawing the sludge and transferring it to one of the other tanks, (h) a siphon seal box mounted on the outside of the settling tank below the level of the weir and into which the discharge end of the siphon tube extends, (i) means for establishing sludge flow in the siphon pipe.

18. In a sewage treatment plant having influent thereto raw solid-containing sewage, a plurality of tanks for treating the sewage and means for transferring sewage from one tank to another, the combination therewith of a settling tank for receiving solid-containing sewage and separating the sewage into solid-containing sludge and clarified sewage liquor, comprising, (a) a generally cylindrical upper portion forming upper tank side walls, (b) a generally conically shaped lower portion continuous with the upper portion forming inwardly sloping lower tank side walls into which the sludge settles, (c) an overflow weir and trough member around the upper inner wall of the tank for maintaining the liquid level in the tank and transferring clarified sewage liquor to a different tank, (d) a centrally disposed tube rotatably mounted on the tank and extending from above the weir into the sludge containing lower portion of the tank, (e) means for rotating the tube, (f) a scraper carried by the tube and engaging the sloping tank side walls to clean the latter of sludge, (g) a horizontally disposed sprocket wheel mounted to the rotatable tube above the level of the weir, (h) a generally cylindrical open-ended member depending from the wheel and having its side walls in spaced relation to the rotatable tube forming an influent well into which solid-containing sewage entering the settling tank is deposited, (i) a motor, (j) means operatively connected to the motor to the sprocket wheel for rotating the latter, (k) a siphon tube disposed within the rotatable tube and extending from above the level of the weir downwardly into the sludge in the lower portion of the tank for withdrawing the sludge and transferring it to one of the other tanks, and (l) means for establishing sludge flow in the siphon pipe.

19. In a sewage treatment plant having influent thereto raw solid-containing sewage, a plurality of tanks for treating the sewage and means for transferring sewage from one tank to another, the combination therewith of a settling tank for receiving solid-containing sewage and separating the sewage into solid-containing sludge and clarified sewage liquor, comprising, (a) a generally cylindrical upper portion forming upper tank side walls, (b) a generally conically shaped lower portion continuous with the upper portion forming inwardly sloping lower tank side walls into which the sludge settles, (c) an overflow weir and trough member around the upper inner wall of the tank for maintaining the liquid level in the tank and transferring clarified sewage liquor to a different tank, (d) a centrally disposed tube rotatably mounted on the tank and extending from above the weir into the sludge containing lower portion of the tank,
(e) means for rotating the tube,
(f) a scraper carried by the tube and engaging the sloping tank side walls to clean the latter of sludge,
(g) a vertically disposed scum baffle mounted on the weir and spaced radially inward therefrom, extending vertically above and below the weir,
(h) a radially extending vertically disposed skimmer blade carried by the rotating tube, extending radially outward to a location adjacent the scum baffle and extending vertically above and below the level of the weir,
(i) a siphon tube disposed within the rotatable tube and extending from above the level of the weir downwardly into the sludge in the lower portion of the tank for withdrawing the sludge and transferring it to one of the other tanks,
(j) means for establishing sludge flow in the siphon pipe.

20. A sewage treatment plant having means for introducing raw solid-containing sewage thereinto, comprising,
(a) an aeration tank for receiving the influent raw sewage and having sufficient capacity to accept surges in the influent rate without overflowing,
(b) a settling tank for the separation of solid-containing sewage into solid-containing sludge and clarified sewage liquor,
(c) a chemical treatment tank for the treating of clarified sewage liquor,
(d) means for transferring solid-containing sewage from the aeration tank to the settling tank at a substantially constant rate greater than the average rate influent to the plant.
(e) means for transferring sludge from the settling tank to the aeration tank at a rate less than the rate of transfer to the settling tank,
(f) means for periodically withdrawing solids from the circulation established between the aeration and settling tanks comprising,
  (1) an aerobic digester tank for the digestion of sludge solids deposited therein,
  (2) means for periodically transferring solid-containing sludge from the settling tank to the digester tank, and
  (3) means for discharging digested solids from the digester tank to a disposal area,
(g) the aeration tank and digester tank comprising a single vessel enclosure with outer walls, and an inner partition wall dividing the enclosure into aeration and digester tank sections, the inner partition wall extending to a height below the level of the outer walls to form a weir for the flow of liquid from the digester to aeration tank,
(h) means for transferring clarified sewage liquor from the settling tank to the chemical treatment tank at a rate approximately equal to the difference between the earlier mentioned rates of transfer to and from the settling tank, and (i) means for discharging the chemically treated liquor from the chemical treatment tank.

21. The sewage treatment plant as defined in claim 20 including a second inner partition wall dividing the digester tank section into two separate digester tanks wherein the second partition wall extends from the first mentioned inner partition wall to a tank enclosure outer wall.

22. A sewage treatment plant, comprising
(a) an aeration tank for receiving solid-containing raw sewage influent to the plant,
(b) a settling tank for receiving solid-containing sewage for separation into solid containing sludge and clarified sewage liquor,
(c) an aerobic digester tank, the aeration, aerobic digester, and settling tanks being at successively higher elevations sufficient to establish a gravity flow of fluids between the settling tank and the aerobic digester and between the aerobic digester and the aeration tank,
(d) a chemical treatment tank for receiving and treating clarified sewage liquor,
(e) means for transferring solid-containing sewage from the aeration tank to the settling tank at a substantially constant rate,
(f) means for transferring sludge from the settling tank to the aeration tank, including means for selectively transferring a portion of the sludge to the aerobic digester tank,
(g) means for transferring clarified sewage liquor from the settling tank to the chemical treatment tank, and
(h) means for discharging chemically treated sewage from the chemical treatment tank to a disposal area.

References Cited

UNITED STATES PATENTS

| | | | |
|---|---|---|---|
| 1,717,764 | 6/1929 | D'Olier | 210—528 X |
| 2,854,146 | 9/1958 | Nebolsine et al. | 210—528 X |
| 3,047,492 | 7/1962 | Gambrel | 210—15 X |
| 3,135,686 | 6/1964 | Campbell et al. | 210—15 X |
| 1,139,024 | 5/1915 | Frank | 210—7 |
| 3,347,784 | 10/1967 | Kappe | 210—7 X |
| 3,366,242 | 1/1968 | Nicol | 210—195 |

FOREIGN PATENTS

| | | |
|---|---|---|
| 132,581 | 9/1919 | Great Britain. |
| 703,182 | 1/1954 | Great Britain. |

OTHER REFERENCES

Buswell, A. M., The Chemistry of Water and Sewage Treatment, 1928, The Chemical Catalog Co., Inc., N.Y., pp. 316–317 relied on (GP. 176).

Imhoff, K., et al., Sewage Treatment, 2d edit., 1956, John Wiley, N.Y., pp. 136–137 and 165 relied on.

MICHAEL E. ROGERS Primary Examiner

U.S. Cl. X.R.

210—8, 195, 262, 525, 528